United States Patent
Pheiffer et al.

(10) Patent No.: US 10,621,720 B2
(45) Date of Patent: Apr. 14, 2020

(54) DEFORMABLE REGISTRATION OF MAGNETIC RESONANCE AND ULTRASOUND IMAGES USING BIOMECHANICAL MODELS

(71) Applicant: Siemens Healthcare GmbH, Erlangen (DE)

(72) Inventors: Thomas Pheiffer, Langhorne, PA (US); Ankur Kapoor, Plainsboro, NJ (US); Jin-hyeong Park, Princeton, NJ (US); Ali Kamen, Skillman, NJ (US)

(73) Assignee: Siemens Healthcare GmbH, Erlangen (DE)

(*) Notice: Subject to any disclaimer, the term of this patent is extended or adjusted under 35 U.S.C. 154(b) by 478 days.

(21) Appl. No.: 15/499,302

(22) Filed: Apr. 27, 2017

(65) Prior Publication Data
US 2018/0315181 A1    Nov. 1, 2018

(51) Int. Cl.
G06T 7/00    (2017.01)
G06T 7/33    (2017.01)
G06T 7/11    (2017.01)

(52) U.S. Cl.
CPC .............. *G06T 7/0012* (2013.01); *G06T 7/33* (2017.01); *G06T 2207/10088* (2013.01); *G06T 2207/10136* (2013.01); *G06T 2207/20076* (2013.01); *G06T 2207/20081* (2013.01); *G06T 2207/30081* (2013.01)

(58) Field of Classification Search
None
See application file for complete search history.

(56) References Cited

U.S. PATENT DOCUMENTS

| 2008/0287803 A1* | 11/2008 | Li ........................ A61B 8/12 600/466 |
| 2013/0324841 A1 | 12/2013 | Kamen et al. |
| 2016/0019716 A1* | 1/2016 | Huang ................. G06T 3/0068 345/633 |

OTHER PUBLICATIONS

S. Khallaghi, et al, "Statistical Biomechanical Surface Registration: Application to MRTRUS Fusion for Prostate Interventions," IEEE Trans. Med. Imaging, vol. 34, No. 12, pp. 2535-2549, Dec. 2015.
Y. Zheng, et al., "Four-chamber heart modeling and automatic segmentation for 3D cardiac CT volumes using marginal space learning and steerable features," IEEE Trans. Medical Imaging, vol. 27, No. 11, pp. 1668-1681, 2008.

\* cited by examiner

*Primary Examiner* — Matthew C Bella
*Assistant Examiner* — Brian D Shin

(57) ABSTRACT

A computer-implemented method for performing deformable registration between Magnetic Resonance (MR) and Ultrasound (US) images include receiving an MR volume depicting an organ and segmenting the organ from the MR volume to yield a first 3D point representation of the organ in MR coordinates. Additionally, a US volume depicting an organ is received and the organ is segmented from the US volume to yield a second 3D point representation of the organ in US coordinates. Next, a plurality of point correspondences between the first 3D point representation and the second 3D point representation are determined. Then, a biomechanical model is applied to register the MR volume to the US volume. The plurality of point correspondences are used as displacement boundary conditions for the biomechanical model.

18 Claims, 4 Drawing Sheets

DEFORMABLE REGISTRATION OF MAGNETIC RESONANCE AND ULTRASOUND IMAGES USING BIOMECHANICAL MODELS

TECHNICAL FIELD

The present disclosure relates generally to methods, systems, and apparatuses for performing deformable registration of Magnetic Resonance (MR) and Ultrasound (US) images using biomechanical models. The techniques described herein may be applied to studies of the prostate, as well as other anatomical organs.

BACKGROUND

Prostate cancer is typically diagnosed by transrectal US guided needle biopsy. However, due to the low sensitivity of this procedure, repeat biopsies are often required to confirm a diagnosis. It is known that using additional imaging information from Magnetic Resonance (MR) can improve the sensitivity of the biopsy procedure, due to the additional subsurface detail that is offered by MR compared to US images. For example, MR findings of suspected cancer nodules can be used to guide needle placement during US-guided biopsy.

In order for MR to be effectively used to supplement US guidance, an image registration procedure is required to fuse the MR and US images into a common coordinate space. In clinical practice, this image registration is often merely done mentally by the clinician after consulting both images visually, although there are a number of techniques to perform this registration computationally. The simplest method involves computing a rigid transformation to align the prostate using point or surface features. However, a rigid transformation is typically insufficient to accurately align prostate structures due to soft tissue deformation which occurs during US imaging. More sophisticated methods utilize some kind of deformable registration, such as a biomechanical tissue model.

SUMMARY

Embodiments of the present invention address and overcome one or more of the above shortcomings and drawbacks by providing methods, systems, and apparatuses related to deformable registration of magnetic resonance and ultrasound organ images using biomechanical models. Briefly, the techniques described herein utilize a biomechanical model, where displacement boundary conditions are generated and assigned from organ segmentations in MR and US images.

According to some embodiments, a computer-implemented method for performing deformable registration between Magnetic Resonance (MR) and Ultrasound (US) images includes receiving an MR volume depicting an organ and segmenting the organ from the MR volume to yield a first 3D point representation of the organ in MR coordinates. Additionally, a US volume depicting an organ is received and the organ is segmented from the US volume to yield a second 3D point representation of the organ in US coordinates. The 3D point representations may be, for example, a mesh or point cloud. Next, a plurality of point correspondences between the first 3D point representation and the second 3D point representation are determined. Then, a biomechanical model is applied to register the MR volume to the US volume. The point correspondences are used as displacement boundary conditions for the biomechanical model. Additional features and advantages of the invention will be made apparent from the following detailed description of illustrative embodiments that proceeds with reference to the accompanying drawings.

In some embodiments of the aforementioned method, the segmentation of the organ from the MR volume and the segmentation of the organ from the US volume are each determined automatically using one or more machine learning models. In one embodiment, the segmentation of the MR volume is performed prior to the segmentation of the US volume, and size and shape data from the segmentation of the MR volume is used as a constraint for the segmentation of the US volume. The machine learning models may be trained using training dataset comprising a plurality of training MR volumes and a plurality of training US volume. The training process may be performing using a bounding box defined around each volume. First, annotation data is created for each volume included in the training dataset using a mesh representation of the respective volume defined by a set of points and triangular information for faces of the mesh representation. Next, a bounding box is defined around each volume in the training dataset. The bounding box is defined by three position values, three orientations values, and three size values. An organ shape is determined within each bounding box. Then, the organ shape and the annotation data for each volume in the training dataset are used to train the machine learning models. In one embodiment, the training process is applied to the training MR volumes before the training process is applied to the US volumes, and the three size values used in defining the bounding box for each US volume are defined using the three size values for the bounding box of a corresponding MR volume in the training dataset.

Additional enhancements, variations, or other modifications may be made to the methods discussed above in different embodiments. For example, the MR volume and the US volume may be acquired during an intraoperative procedure. In some embodiments, the method further includes segmenting subsurface structures of the organ from subsurface imaging data to yield a third 3D point representation of the organ. Point correspondences may then further comprise point correspondences (i) between the first 3D point representation and the third 3D point representation and (ii) between the second 3D point representation and the third 3D point representation. In other embodiments, subsurface image data in the MR volume is warped into US coordinate space based on the registration of the MR volume to the US volume. The subsurface image data may then be displayed overlaying the US volume.

According to another aspect of the present invention, a computer-implemented method for performing deformable registration between images in two image modalities includes segmenting an organ from a first image volume acquired in a first modality to yield a first 3D point representation of the organ and segmenting the organ from a second image volume acquired in a second modality to yield a second 3D point representation of the organ. Point correspondences between the first 3D point representation and the second 3D point representation are determined and a biomechanical mode is applied to register the first image volume to the second image volume. As with the other method described above, the point correspondences are used as displacement boundary conditions for the biomechanical model.

According to other embodiments of the present invention, a system performing deformable registration between MR and US images includes a parallel computing platform comprising a plurality of processors. This platform is configured to apply a first machine learning model to segment an organ from an MR volume to yield a first 3D point representation of the organ in MR coordinates and apply a second machine learning model to segment the organ from a US volume to yield a second 3D point representation of the organ in US coordinates. The platform determines a plurality of point correspondences between the first 3D point representation and the second 3D point representation. Then, the platform applies a biomechanical model to register the MR volume to the US volume, with the point correspondences used as displacement boundary conditions for the biomechanical model.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION

Embodiments of the present invention address and overcome one or more of the above shortcomings and drawbacks, by providing methods, systems, and apparatuses related to performing deformable registration of Magnetic Resonance (MR) and Ultrasound (US) organ images using biomechanical models. The organ of interest may be the prostate; however, it should be noted that the general techniques described herein are applicable to various anatomical organs. The MR images are typically high resolution preoperative volumes which can be used to construct a digital patient-specific organ model represented as a topological structure such as a mesh. The US images are typically a 3D volume of compounded slices. The registration of these data is difficult to compute due to the non-rigid deformation which occurs between the imaging sessions, and the lack of known feature correspondences. The techniques described herein are based, in part, on a process for performing a biomechanically driven registration with a tissue model using point correspondences generated from a template-based segmentation. The segmentations provide correspondences and drive a biomechanical tissue model to register the image data. The techniques described herein may be applied, for example, to provide image guidance for needle biopsy procedures or other interventions.

Figure 1:
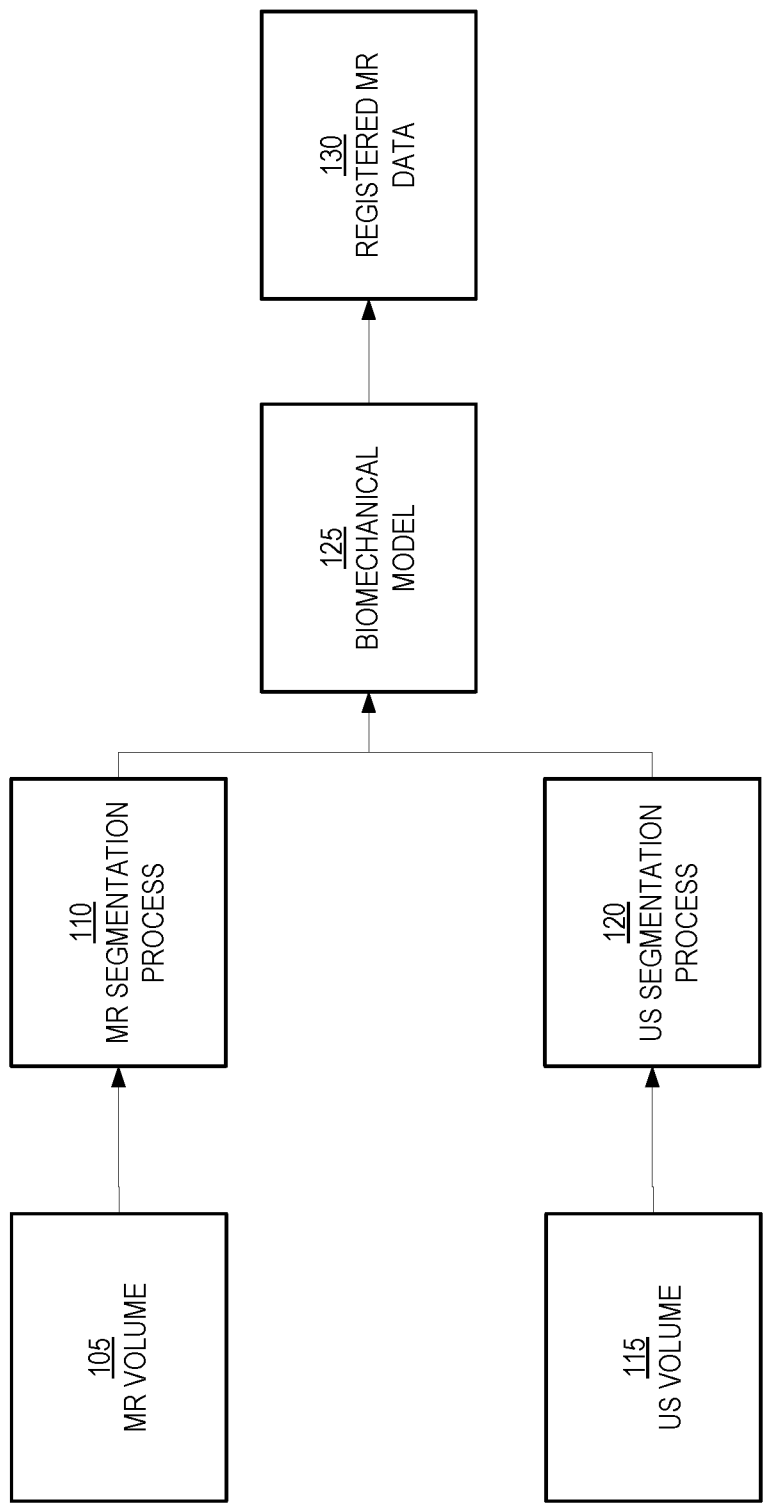
FIG. 1 shows an example registration workflow 100 according to some embodiments.
Figure 2:
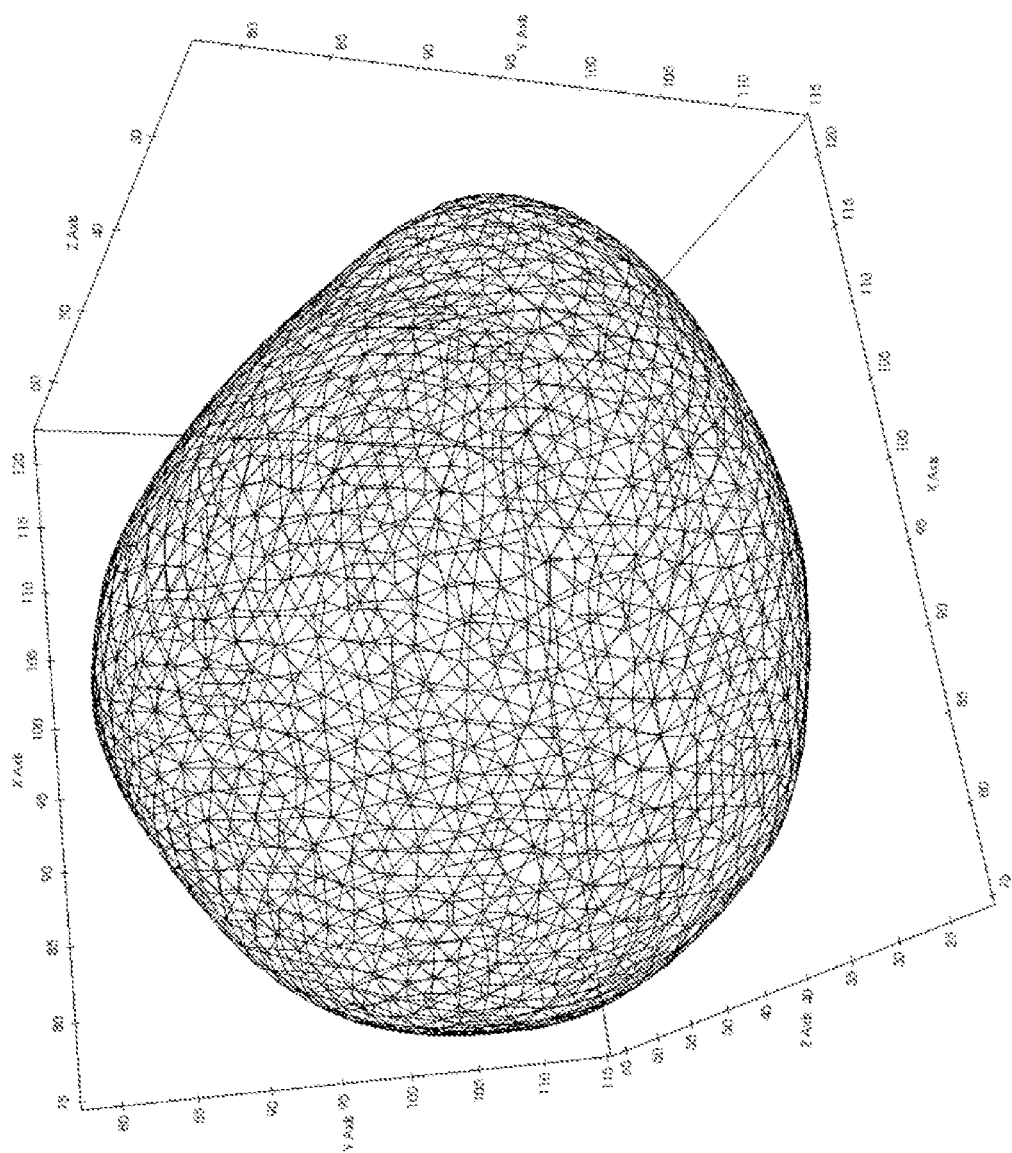
FIG. 2 shows an example mesh representative of a prostate in a bounding box calculated using the techniques described herein.

FIG. 1 shows an example registration workflow 100 according to some embodiments. This workflow is discussed below with reference to MR and US image volumes; however, the general principles of the workflow may be applied to various imaging modalities. The MR Volume 105 is typically captured some time before the US-guided procedure used to acquire the 3D US Volume 115 (described below); however, in some embodiments the MR Volume 105 may also be obtained from an intraoperative MR scanner during the procedure where the 3D US Volume 115 is acquired. The MR Volume 105 provides dense anatomical or functional data. MR Segmentation Process 110 segments an organ of interest from the MR Volume 105 and constructs a 3D point representation of the organ in MR coordinates which will be used to create the Biomechanical Model 125.

The 3D US Volume 115 is captured as either a native 3D volume or may be a volume compounded from a series of tracked 2D US images, depending on the hardware configuration of the US machine. During the US Segmentation Process 120, the organ of interest is segmented from the US volume to provide a 3D point representation in US coordinates, as either a mesh or point cloud.

The two segmented objects are sampled the same way on the surface. There are correspondences implicitly defined in a dense fashion all along the surface. These correspondences are used as displacement boundary conditions that feed into a Biomechanical Model 125 to compress the segmented MR volume to the US volume, or vice versa. That is, because the points of each segmented volume correspond spatially, the Biomechanical Model 125 can be used to force those correspondences to match in 3D space to deform the volumes together.

The organ segmentation algorithm applied in the workflow 100 discussed above is designed to be automated using one or more machine learning models. Training data of organ volumes are collected from diverse patients. The organ shapes in each volume is then manually or automatically annotated using a mesh representation which is defined by a set of points and triangular information for the faces. The organ segmentation algorithm may be understood as comprising two stages: 1) localization of the organ in the input volume and 2) shape computation in the localized region.

For localization of the organ, a 3-dimensional (3D) bounding box per each annotated mesh of an organ is defined. The bounding box approximates the location of the organ along with orientation and scale. The bounding box is defined by nine parameters: three position values (x, y, z) which are the center coordinate of the bounding box in the 3D coordinate system; three orientation values ($\theta_x$, $\theta_y$, $\theta_z$) which are the three angles with respected to x-axis, y-axis and z-axis, and three size or scale values (w, h, d) specifying the width, height and depth of the box, respectively.

The bounding box detection model is trained to find the nine parameters using the training volumes and their corresponding annotations. This is a regression problem which predicts the nine values from a given input image/volume data. There are several machine learning algorithms that may be applied solve this problem. In some embodiments, the regression problem is converted into a series of two-class classification problems, one is a target positive class and the other is a negative class. Additionally techniques such as Marginal Space Learning (MSL) with Probabilistic Boosting Tree (PBT) may be applied. MSL with PBT marginalizes the parameter space into three stages, position space, orientation space, and finally scale space.

After finding a bounding box, the organ shape is computed inside the box. Let us denote N training shapes as $S_1, S_2 \ldots S_N$, where $S_i = \{p_{i1}, p_{i2} \ldots p_{id}\}$, $p_{ij} \in R^3$ and $S_i \in R^{3*}$. $p_{ij}$ is the coordinate of the j-th point of Si in the local 3D coordinate system defined using the bounding box. All the training shapes have full correspondence relationship with respect to their individual points.

Let S denote the mean shape of $S_1, S_2 \ldots S_N$, where meaningful correspondence is preserved among the shapes. The mean shape is computed after aligning the shapes by removing the effect of variation caused by the location, orientation and scale. This alignment may be performed using shape analysis algorithms such as Procrustes analysis. A parameterized M-dimensional linear shape sub-space, $\Phi_1, \Phi_2 \ldots \Phi_M$, where $\Phi_M \in R^{3*d}$ may be computed using the point data. Computation of the subs-pace may be performed using, for example, Multiple Discriminant Analysis (MDA), Principal Component Analysis (PCA), or other similar linear transformation methods generally known in the art. Once the sub-space is computed, each shape can be represented as linear combination of the sub-space basis as follows:

$$S_i = \sum_{j=1}^{M} \overline{S} + \lambda_j \Phi_j, \lambda_j \in R \tag{1}$$

The problem of shape computation inside the 3D bounding box may be defined as finding the parameters of $\lambda_1, \lambda_2 \ldots_M$. The shape model may be trained using a training dataset of MR shapes and US shapes.

Figure 3:
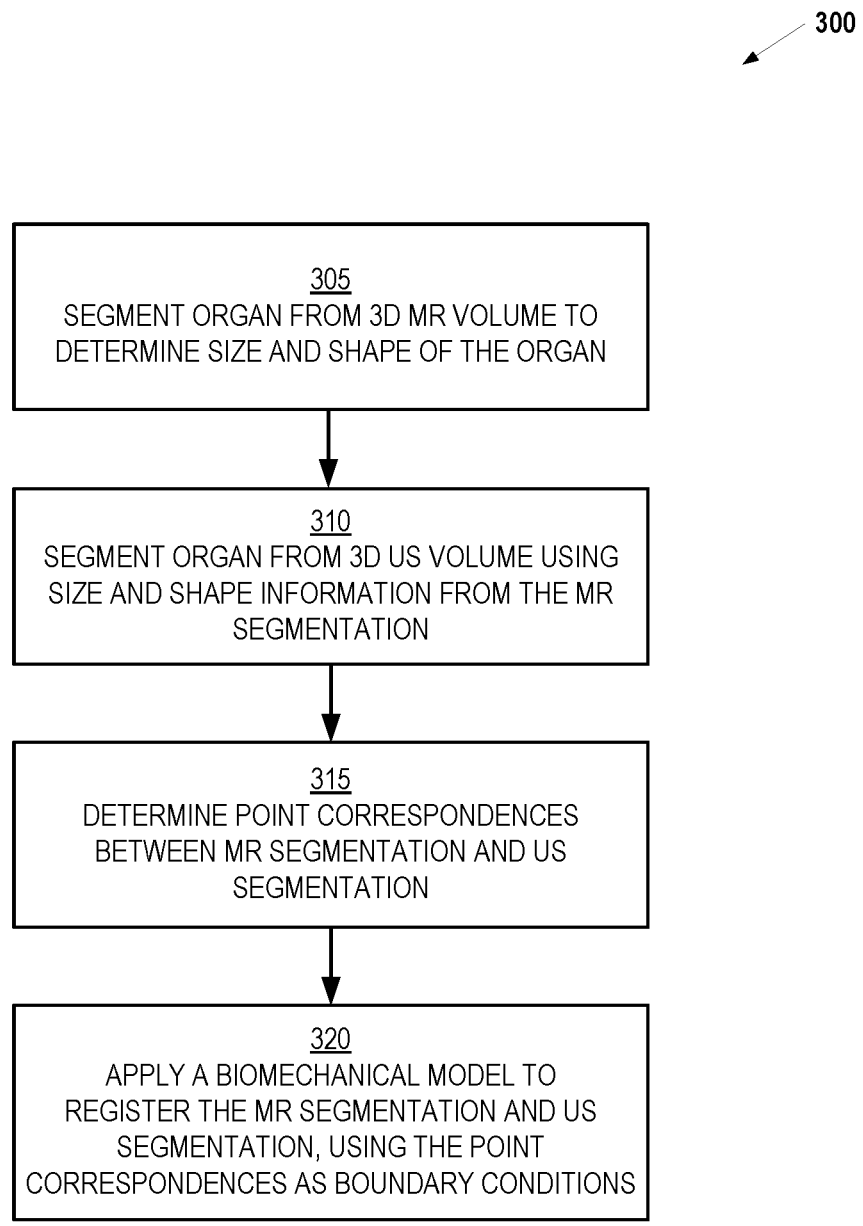
FIG. 3 provides a flowchart illustrating a process 300 which applies the general workflow shown in FIG. 1.

FIG. 3 provides a flowchart illustrating a process 300 which applies the general workflow 100 shown in FIG. 1. Starting at step 305, the MR organ is segmented from 3D MR volume using the machine learning model and the bounding box method described above. The resulting segmentation is a 3D point representation of the organ (e.g., point cloud or mesh). It is generally preferable to extract the organ from the MR volume rather than the US 3D volume because, in the MR volume, it is relatively easier to segment the organ more accurately. As noted above, one of the outputs of the machine learning model is the size (w, h, d) and shape $(\lambda_1, \lambda_2 \ldots_M)$ of the organ.

Continuing with reference to FIG. 3, at step 310, information from the MR segmentation is used as a priori knowledge to perform the US organ segmentation. More specifically, the location (x, y, z) and orientation $(\theta_x, \theta_y, \theta_z)$ of the US organ are computed using the machine learning model and the bounding box method described above; however, the model is constrained by fixing the size (w, h, d) and shape parameters $(\lambda_1, \lambda_2 \ldots \lambda_M)$ to the values given by MR segmentation. The benefit of using the prior information is that the problem complexity decreased significantly from M+9 parameters to six parameters. Furthermore, some part of organ boundary is not well defined and the prior shape computed from MR volume can overcome this problem. In some embodiments the same machine learning model can be applied in both segmentations. For example, the model may allow for a variable number of parameters to be specified as input. In other embodiments, the MR segmentation and the US segmentation may be performed using two different machine learning models. As with the MR segmentation, the US segmentation is a 3D point representation of the organ of interest.

At step 315, the point correspondences from the organ MR and US segmentations are determined. For example, with the segmentations at the same location and orientation, it may be assumed that each point in the MR segmentation corresponds with the closest point to it in the US segmentation (i.e., a nearest neighbor heuristic). In other embodiments, more complex techniques may be applied such as robust point matching (RPM) where an optimal transformation between the point sets is determined using software correspondence between points. The point correspondences may be stored as the vectors mapping from the MR segmentation to the US segmentation.

If subsurface imaging data (e.g., Computed Tomography image) are available, segmentations of subsurface structures in the organ may be provided as additional point correspondences at step 315. That is, the correspondences generated at step 315 can include point correspondences (between the MR 3D point representation and subsurface 3D point representation, as well as correspondences between the US 3D point representation and the surface 3D point representation. These additional correspondences may be determined using the same general techniques discussed above.

Then, at step 320, the point correspondences from the segmentations are utilized as displacement boundary conditions to a biomechanical model. In some embodiments, a finite element method (FEM) solution for the equations of motion describing the modes of organ deformation is applied. In this approach, the organ domain is discretized as a tetrahedral mesh from the geometry of the MR segmentation surface. In some embodiments, the equations applied during mesh generation are the standard 3D Navier-Cauchy equations for the tissue displacement field at static equilibrium:

$$\frac{E}{2(1+v)(1-2v)} \nabla (\nabla \cdot u) + \frac{E}{2(1+v)} \nabla^2 u + F = 0 \tag{2}$$

here E is Young's modulus, v is Poisson's ratio, u is the 3D displacement vector at a point in the tissue, and F is the applied body force distribution.

The displacements at each point of the tissue are then found such that Equation (2) is satisfied. According to some embodiments, linear basis functions are defined on the tetrahedral elements and perform the Galerkin weighted residual method to construct a linear system of equations with the form:

$$Ku = f \tag{3}$$

where K is the stiffness matrix containing contributions from the material properties and constitutive Equation 2. The material properties of the organ may be approximated based on values from the literature. Alternatively, if available, patient-specific material properties may be assigned to the model from MR or US elastography modalities. The vector u in Equation 3 contains mesh nodal displacements, and f contains a vector of applied displacement boundary conditions. These displacement conditions are calculated for the boundary nodes in f based on the vectors mapping from the MR segmentation to the US segmentation. The displacement boundary conditions known from these segmentation correspondences are assigned by modifying the appropriate equations in Equation 3 to give a final system of equations:

$$Au = b \tag{3}$$

which is solved for the nodal displacements satisfying the displacement boundary conditions and material properties.

The nodal displacements from the biomechanical model solution provide a non-rigid transformation which describes the organ deformation between the MR and US imaging scans. This displacement field can then be used to transform organ structures in the MR organ to the same coordinate system as the US organ (or vice versa). For example, the displacements can be used to warp other meshes segmented from the MR, such as suspected nodules or planning annotations.

The displacements could also be used to directly warp the image information itself to provide overlays. For example, in one embodiment, subsurface image data in the MR volume is warped into the US coordinate space based on the registration of the MR volume to the US volume. Then, the subsurface image data is displayed for the user overlaid on the US volume. Any image warping technique generally known in the art may be applied to warp the MR data.

Figure 4:
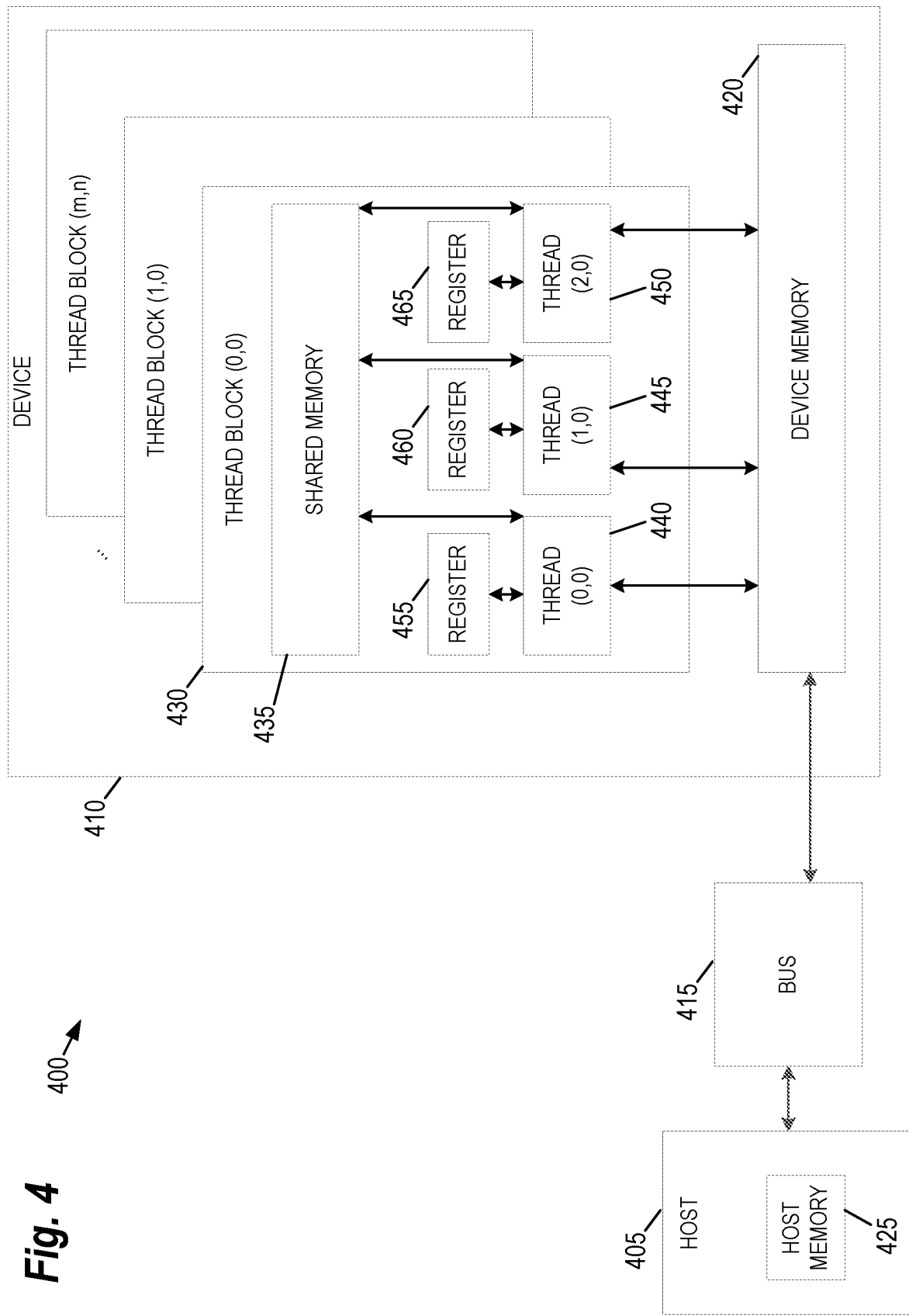
FIG. 4 provides an example of a parallel processing memory architecture 400 that may be utilized to implement the machine learning models and other aspects of the various workflows discussed herein.

FIG. 4 provides an example of a parallel processing memory platform 400 that may be utilized to implement the machine learning models and other aspects of the various workflows discussed herein. This platform 400 may be used in embodiments of the present invention where NVIDIA CUDA™ (or a similar parallel computing platform) is used. The architecture includes a host computing unit ("host") 405 and a graphics processing unit (GPU) device ("device") 410 connected via a bus 415 (e.g., a PCIe bus). The host 405 includes the central processing unit, or "CPU" (not shown in FIG. 4), and host memory 425 accessible to the CPU. The device 410 includes the graphics processing unit (GPU) and its associated memory 420, referred to herein as device memory. The device memory 420 may include various types of memory, each optimized for different memory usages. For example, in some embodiments, the device memory includes global memory, constant memory, and texture memory.

Parallel portions of a big data platform and/or big simulation platform (see FIG. 4) may be executed on the platform 400 as "device kernels" or simply "kernels." A kernel comprises parameterized code configured to perform a particular function. The parallel computing platform is configured to execute these kernels in an optimal manner across the platform 400 based on parameters, settings, and other selections provided by the user. Additionally, in some embodiments, the parallel computing platform may include additional functionality to allow for automatic processing of kernels in an optimal manner with minimal input provided by the user.

The processing required for each kernel is performed by a grid of thread blocks (described in greater detail below). Using concurrent kernel execution, streams, and synchronization with lightweight events, the platform 400 of FIG. 4 (or similar architectures) may be used to parallelize portions of the machine model-based operations performed in training or performing the segmentations discussed herein. Additionally, concurrent execution may be utilized for determining individual correspondences between points in the point clouds or meshes derived from the 3D volumes.

The device 410 includes one or more thread blocks 430 which represent the computation unit of the device 410. The term thread block refers to a group of threads that can cooperate via shared memory and synchronize their execution to coordinate memory accesses. For example, in FIG. 4, threads 440, 445 and 450 operate in thread block 430 and access shared memory 435. Depending on the parallel computing platform used, thread blocks may be organized in a grid structure. A computation or series of computations may then be mapped onto this grid. For example, in embodiments utilizing CUDA, computations may be mapped on one-, two-, or three-dimensional grids. Each grid contains multiple thread blocks, and each thread block contains multiple threads. For example, in FIG. 4, the thread blocks 430 are organized in a two dimensional grid structure with m+1 rows and n+1 columns. Generally, threads in different thread blocks of the same grid cannot communicate or synchronize with each other. However, thread blocks in the same grid can run on the same multiprocessor within the GPU at the same time. The number of threads in each thread block may be limited by hardware or software constraints.

Continuing with reference to FIG. 4, registers 455, 460, and 465 represent the fast memory available to thread block 430. Each register is only accessible by a single thread. Thus, for example, register 455 may only be accessed by thread 440. Conversely, shared memory is allocated per thread block, so all threads in the block have access to the same shared memory. Thus, shared memory 435 is designed to be accessed, in parallel, by each thread 440, 445, and 450 in thread block 430. Threads can access data in shared memory 435 loaded from device memory 420 by other threads within the same thread block (e.g., thread block 430). The device memory 420 is accessed by all blocks of the grid and may be implemented using, for example, Dynamic Random-Access Memory (DRAM).

Each thread can have one or more levels of memory access. For example, in the platform 400 of FIG. 4, each thread may have three levels of memory access. First, each thread 440, 445, 450, can read and write to its corresponding registers 455, 460, and 465. Registers provide the fastest memory access to threads because there are no synchronization issues and the register is generally located close to a multiprocessor executing the thread. Second, each thread 440, 445, 450 in thread block 430, may read and write data to the shared memory 435 corresponding to that block 430. Generally, the time required for a thread to access shared memory exceeds that of register access due to the need to synchronize access among all the threads in the thread block. However, like the registers in the thread block, the shared memory is typically located close to the multiprocessor executing the threads. The third level of memory access allows all threads on the device 410 to read and/or write to the device memory. Device memory requires the longest time to access because access must be synchronized across the thread blocks operating on the device. Thus, in some embodiments, data can be divided into segments using data locality techniques generally known in the art. Then, each portion of the data can be processed in parallel using register memory, with shared and device memory only being used as necessary to combine the results to provide the results for the final dataset.

The embodiments of the present disclosure may be implemented with any combination of hardware and software. For example, aside from parallel processing architecture presented in FIG. 4, standard computing platforms (e.g., servers, desktop computer, etc.) may be specially configured to perform the techniques discussed herein. In addition, the embodiments of the present disclosure may be included in an article of manufacture (e.g., one or more computer program products) having, for example, computer-readable, non-transitory media. The media may have embodied therein computer readable program code for providing and facilitating the mechanisms of the embodiments of the present disclosure. The article of manufacture can be included as part of a computer system or sold separately.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

An executable application, as used herein, comprises code or machine readable instructions for conditioning the processor to implement predetermined functions, such as those of an operating system, a context data acquisition system or other information processing system, for example, in response to user command or input. An executable procedure is a segment of code or machine readable instruction, sub-routine, or other distinct section of code or portion of an executable application for performing one or more particular processes. These processes may include receiving input data and/or parameters, performing operations on received input data and/or performing functions in response to received input parameters, and providing resulting output data and/or parameters.

A graphical user interface (GUI), as used herein, comprises one or more display images, generated by a display processor and enabling user interaction with a processor or other device and associated data acquisition and processing functions. The GUI also includes an executable procedure or executable application. The executable procedure or executable application conditions the display processor to generate signals representing the GUI display images. These signals are supplied to a display device which displays the image for viewing by the user. The processor, under control of an executable procedure or executable application, manipulates the GUI display images in response to signals received from the input devices. In this way, the user may interact with the display image using the input devices, enabling user interaction with the processor or other device.

The functions and process steps herein may be performed automatically or wholly or partially in response to user command. An activity (including a step) performed automatically is performed in response to one or more executable instructions or device operation without user direct initiation of the activity.

The system and processes of the figures are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. As described herein, the various systems, subsystems, agents, managers and processes can be implemented using hardware components, software components, and/or combinations thereof. No claim element herein is to be construed under the provisions of 35 U.S.C. 112, sixth paragraph, unless the element is expressly recited using the phrase "means for."

The invention claimed is:

1. A computer-implemented method for performing deformable registration between Magnetic Resonance (MR) and Ultrasound (US) images, the method comprising:
   receiving an MR volume depicting an organ;
   segmenting the organ from the MR volume to yield a first 3D point representation of the organ in MR coordinates, wherein segmentation of the organ from the MR volume is automatically performed using one or more machine learning models to detect a MR bounding box containing the organ in the MR volume and computing the first 3D point representation by applying one or more shape models to portions of the MR volume within the MR bounding box;
   receiving a US volume depicting the organ;
   segmenting the organ from the US volume to yield a second 3D point representation of the organ in US coordinates, wherein segmentation of the organ from the US volume is automatically performed using the one or more machine learning models to detect a US bounding box containing the organ in the US volume and computing the second 3D point representation by applying the one or more shape models to portions of the US volume within the US bounding box;
   determining a plurality of point correspondences between the first 3D point representation and the second 3D point representation; and
   applying a biomechanical model to register the MR volume to the US volume, wherein the plurality of point correspondences are used as displacement boundary conditions for the biomechanical model.

2. The method of claim 1, wherein the MR volume and the US volume are both acquired during an intraoperative procedure.

3. The method of claim 1, wherein the first 3D point representation and the second 3D point representation are each a mesh.

4. The method of claim 1, wherein the first 3D point representation and the second 3D point representation are each a point cloud.

5. The method of claim 1, wherein (i) the segmentation of the MR volume is performed prior to the segmentation of the US volume and (ii) size and shape data from the segmentation of the MR volume is used as a constraint for the segmentation of the US volume.

6. The method of claim 1, wherein the one or more machine learning models are trained using training dataset comprising a plurality of training MR volumes and a plurality of training US volumes and the training process comprises:
   for each volume included in the training dataset, creating annotation data using a mesh representation of the respective volume defined by a set of points and triangular information for faces of the mesh representation;
   defining a bounding box around each volume in the training dataset, wherein the bounding box is defined by three position values, three orientations values, and three size values;
   computing an organ shape within each bounding box; and
   using the organ shape and the annotation data for each volume in the training dataset to train the one or more machine learning models.

7. The method of claim 6, wherein (i) the training process is applied to the plurality of training MR volumes before the training process is applied to the plurality of US volumes and (ii) the three size values used in defining the bounding box for each US volume are defined using the three size values for the bounding box of a corresponding MR volume in the training dataset.

8. The method of claim 1, further comprising:
   segmenting subsurface structures of the organ from subsurface imaging data to yield a third 3D point representation of the organ,
   wherein the plurality of point correspondences further comprises point correspondences (i) between the first 3D point representation and the third 3D point representation and (ii) between the second 3D point representation and the third 3D point representation.

9. The method of claim 1, further comprising:
warp subsurface image data in the MR volume into US coordinate space based on the registration of the MR volume to the US volume; and
displaying the subsurface image data overlaid on the US volume.

10. A computer-implemented method for performing deformable registration between images in two image modalities, the method comprising:
segmenting an organ from a first image volume acquired in a first modality to yield a first 3D point representation of the organ, wherein segmentation of the organ from the first image volume is automatically performed using one or more machine learning models to detect a first bounding box containing the organ in the first image volume and computing the first 3D point representation by applying one or more shape models to portions of the first image volume within the first bounding box;
segmenting the organ from a second image volume acquired in a second modality to yield a second 3D point representation of the organ, wherein segmentation of the organ from the second image volume is automatically performed using the one or more machine learning models to detect a second bounding box containing the organ in the second image volume and computing the second 3D point representation by applying the one or more shape models to portions of the second image volume within the second bounding box;
determining a plurality of point correspondences between the first 3D point representation and the second 3D point representation; and
applying a biomechanical model to register the first image volume to the second image volume, wherein the plurality of point correspondences are used as displacement boundary conditions for the biomechanical model.

11. The method of claim 10, wherein the first 3D point representation and the second 3D point representation are each a mesh.

12. The method of claim 10, wherein the first 3D point representation and the second 3D point representation are each a point cloud.

13. The method of claim 10, wherein (i) the segmentation of the first image volume is performed prior to the segmentation of the second image volume and (ii) size and shape data from the segmentation of the first image volume is used as a constraint for the segmentation of the second image volume.

14. The method of claim 10, wherein the one or more machine learning models are trained using training datasets comprising a plurality of training first image volumes and a plurality of training second image volumes and the training process comprises:
for each volume included in the training dataset, creating annotation data using a mesh representation of the respective volume defined by a set of points and triangular information for faces of the mesh representation;
defining a bounding box around each volume in the training dataset, wherein the bounding box is defined by three position values, three orientations values, and three size values;
computing an organ shape within each bounding box; and
using the organ shape and the annotation data for each volume in the training dataset to train the one or more machine learning models.

15. The method of claim 14, wherein (i) the training process is applied to the plurality of training first image volumes before the training process is applied to the plurality of second training image volumes and (ii) the three size values used in defining the bounding box for each training second image volume are defined using the three size values for the bounding box of a corresponding first image volume in the training dataset.

16. The method of claim 10, further comprising:
segmenting subsurface structures of the organ from subsurface imaging data to yield a third 3D point representation of the organ,
wherein the plurality of point correspondences further comprises point correspondences (i) between the first 3D point representation and the third 3D point representation and (ii) between the second 3D point representation and the third 3D point representation.

17. The method of claim 10, further comprising:
warping subsurface image data in the first image volume based on the registration of the first image volume to the second image volume; and
displaying the subsurface image data overlaid on the second image volume.

18. A system performing deformable registration between Magnetic Resonance (MR) and Ultrasound (US) images, the system comprising:
a parallel computing platform comprising a plurality of processors configured to:
apply a first machine learning model to segment an organ from a MR volume to yield a first 3D point representation of the organ in MR coordinates, wherein the first machine learning model is used to detect a MR bounding box containing the organ in the MR volume and compute the first 3D point representation within the MR bounding box;
apply a second machine learning model to segment the organ from a US volume to yield a second 3D point representation of the organ in US coordinates, wherein the second machine learning model is used to detect a US bounding box containing the organ in the US volume and compute the second 3D point representation within the US bounding box;
determine a plurality of point correspondences between the first 3D point representation and the second 3D point representation; and
apply a biomechanical model to register the MR volume to the US volume, wherein the plurality of point correspondences is used as displacement boundary conditions for the biomechanical model.

* * * * *